US007114881B2

(12) United States Patent
Belloni et al.

(10) Patent No.: US 7,114,881 B2
(45) Date of Patent: Oct. 3, 2006

(54) METHOD AND APPARATUS FOR WELDING PIPES TOGETHER

(75) Inventors: Antonio Belloni, Codogno (IT); Renato Bonasorte, Ripalta Cremasca (IT)

(73) Assignee: SAIPEM S.p.A., Milan (IT)

( * ) Notice: Subject to any disclaimer, the term of this patent is extended or adjusted under 35 U.S.C. 154(b) by 0 days.

(21) Appl. No.: 10/380,271

(22) PCT Filed: Oct. 22, 2001

(86) PCT No.: PCT/EP01/12177

§ 371 (c)(1),
(2), (4) Date: Jul. 10, 2003

(87) PCT Pub. No.: WO02/34459

PCT Pub. Date: May 2, 2002

(65) Prior Publication Data

US 2004/0009042 A1    Jan. 15, 2004

(30) Foreign Application Priority Data

Oct. 24, 2000  (GB)  ................................ 0026001.8
Mar. 26, 2001  (GB)  ................................ 0107504.3

(51) Int. Cl.
*F16L 1/00*    (2006.01)
(52) U.S. Cl. ..................................... 405/170; 405/169
(58) Field of Classification Search ................ 405/158, 405/169, 170; 219/61.7; 228/46, 222; 148/505, 148/543, 545, 612, 615, 321
See application file for complete search history.

(56) References Cited

U.S. PATENT DOCUMENTS

| 377,115 A | 1/1888 | Paterson |
|---|---|---|
| 2,227,194 A | 12/1940 | Moise et al. |
| 2,795,689 A | 6/1957 | McNutt |
| 2,956,147 A | 10/1960 | Baker |
| 3,515,843 A | 6/1970 | Arivasu et al. |
| 3,727,025 A | 4/1973 | Dibenedetto |
| 3,800,116 A | 3/1974 | Tanaka et al. |

(Continued)

FOREIGN PATENT DOCUMENTS

DE    296 05 743 U1    7/1996

(Continued)

OTHER PUBLICATIONS

N. Fukuhara et al., "Development of a High-Speed Automatic Welding Process for Simultaneous Use on Inside and Outside Surfaces of Pipes", Welding International 1997, pp. 578-584.

*Primary Examiner*—Sunil Singh
(74) *Attorney, Agent, or Firm*—Buchanan Ingersoll & Rooney PC

(57) ABSTRACT

A method of laying a pipeline (6) underwater includes the steps of holding an end of a pipeline (6), providing a pipe section (5) for extending the pipeline (6), arranging the pipe section (5) adjacent to the end of pipeline (6) thereby defining a circumferential joint (7) to be welded, and welding the pipes (5, 6) together. A plurality of welding torches (8) move along the circumferential joint (7) and are operated simultaneously to weld the pipes together. The pipes (5, 6) are made of TMCP-SC steel. After the root weld is laid, a cooling ring (1) mounted on an internal clamp inside the pipes (5, 6) sprays cooling liquid, for example a fluid spray of atomised water (10) and air, from nozzles (2) onto an interior surface of the pipes (5, 6) in the region of the circumferential joint (7), thereby cooling the pipes (5, 6).

36 Claims, 6 Drawing Sheets

U.S. PATENT DOCUMENTS

Figure 1:
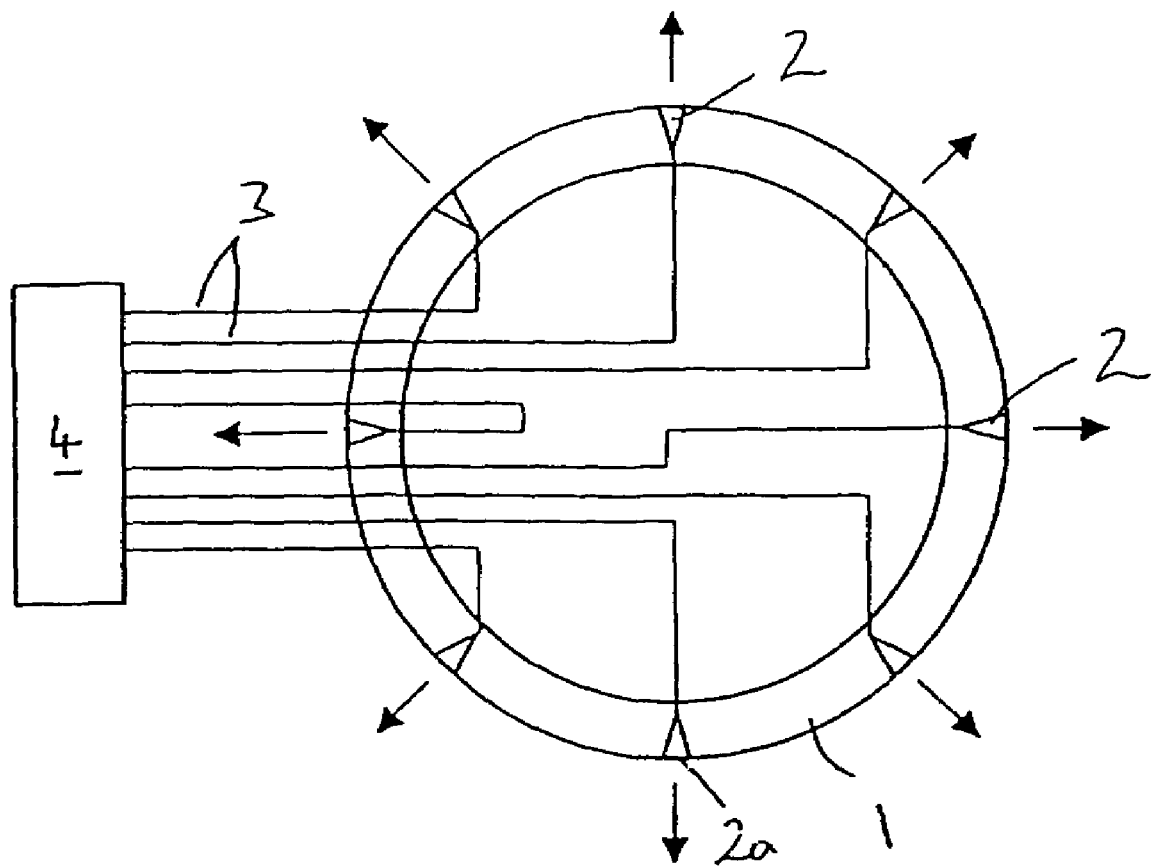

| | | | |
|---|---|---|---|
| 3,932,238 A * | 1/1976 | Safford | 148/593 |
| 4,101,067 A | 7/1978 | Sloan et al. | |
| 4,145,593 A | 3/1979 | Merrick et al. | |
| 4,151,395 A | 4/1979 | Kushner et al. | |
| 4,152,568 A * | 5/1979 | Yamaguchi et al. | 219/61.7 |
| 4,161,640 A | 7/1979 | Bromwich et al. | |
| 4,188,525 A * | 2/1980 | Merrick et al. | 219/125.12 |
| 4,216,365 A | 8/1980 | Peyrot | |
| 4,218,604 A | 8/1980 | Masaoka et al. | |
| 4,223,197 A | 9/1980 | Imai et al. | |
| 4,283,617 A | 8/1981 | Merrick et al. | |
| 4,350,868 A | 9/1982 | Takagi et al. | |
| 4,373,125 A | 2/1983 | Kazlauskas | |
| 4,380,695 A | 4/1983 | Nelson | |
| 4,417,126 A | 11/1983 | Kasahara et al. | |
| 4,485,291 A | 11/1984 | Nomura et al. | |
| 4,495,400 A | 1/1985 | Thompson | |
| 4,525,616 A | 6/1985 | Slavens | |
| 4,542,276 A | 9/1985 | van den Berg | |
| 4,591,294 A | 5/1986 | Foulkes | |
| 4,631,386 A | 12/1986 | Slavens | |
| 4,990,743 A | 2/1991 | Kugai et al. | |
| 5,030,812 A | 7/1991 | Sugitani et al. | |
| 5,136,139 A * | 8/1992 | Gilliland | 219/137 PS |
| 5,146,064 A | 9/1992 | Poirier | |
| 5,171,954 A * | 12/1992 | Rinaldi | 219/61 |
| 5,220,144 A | 6/1993 | Jusionis | |
| 5,347,101 A | 9/1994 | Brennan et al. | |
| 5,816,479 A | 10/1998 | Matherne et al. | |
| 5,961,748 A * | 10/1999 | Ono et al. | 148/333 |
| 6,124,566 A | 9/2000 | Belloni et al. | |
| 6,313,426 B1 | 11/2001 | Belloni et al. | |
| 6,429,405 B1 * | 8/2002 | Belloni et al. | 219/124.34 |

FOREIGN PATENT DOCUMENTS

| | | | |
|---|---|---|---|
| EP | 0 021 856 A1 | | 1/1981 |
| EP | 0 076 018 A1 | | 4/1983 |
| EP | 0 088 501 A1 | | 9/1983 |
| EP | 0 262 545 A1 | | 4/1988 |
| EP | 0 852 984 A1 | | 7/1988 |
| EP | 0 439 975 A1 | | 8/1991 |
| EP | 0 452 582 A1 | | 10/1991 |
| EP | 0 706 849 A1 | | 4/1996 |
| EP | 0 402 648 A2 | | 12/1999 |
| GB | 330519 | | 6/1930 |
| GB | 1025085 | | 4/1966 |
| GB | 1062101 | | 3/1967 |
| GB | 1144220 | | 3/1969 |
| GB | 1 319 239 | | 6/1973 |
| GB | 2 026 044 A | | 1/1980 |
| GB | 2 100 642 A | | 1/1983 |
| GB | 2345016 | * | 6/2000 |
| JP | 56-62923 | * | 5/1981 |
| JP | 58-48638 | * | 3/1983 |
| JP | 59-191575 | | 10/1984 |
| JP | 62-118976 | | 5/1987 |
| JP | 08-243739 | | 9/1996 |
| WO | 90/06205 | | 6/1990 |
| WO | 91/09700 | | 7/1991 |
| WO | 00/38871 | | 7/2000 |
| WO | 00/38872 | | 7/2000 |

* cited by examiner

METHOD AND APPARATUS FOR WELDING PIPES TOGETHER

The present invention relates to an apparatus and method for welding pipes together. More specifically the invention relates to arc-welding together pipe sections when laying pipelines underwater, especially at sea in deep water.

When laying a pipeline at sea in deep water (for example at depths of greater than 1,000 m) it is customary to weld, on a lay-barge, individual pipe sections to a pipe string (the pipe string leading towards the seabed), the pipe string being vertical (or near vertical) at sea-level such that the pipe string forms a shape that looks like the letter "J" Such a method is commonly know as J-laying. The welding process takes place on the lay-barge. The pipe sections may consist of a plurality of pipe lengths each welded together on the lay-barge to form the pipe sections when required.

The end of the pipe string and the pipe section to be joined thereto are commonly prepared prior to the welding process and have bevelled ends, such that when the pipe section and pipe string are arranged immediately before the welding process commences (coaxially with respect to each other), an exterior circumferential groove is defined between them. The welding may be effected by a welding torch arranged on a carriage movably mounted on a circumferential guide track arranged on the outside of the pipe in relation to the circumferential groove. The carriage and torch are moved around the circumference of the pipe and the torch is operated so that an arc is directed into the groove. The welding process generally takes several passes.

Since the pipe sections need to be welded in a vertical position and since there is a limit to how tall a welding tower can sensibly be, the rate at which a pipeline can be laid using the J-lay technique is to a large extent limited by the rate of welding of successive pipe sections to the pipe string. It is therefore desirable to be able to reduce the time it takes to weld a pipe section to the pipe string. Any attempt to speed up the welding process should not however lead to a significant reduction in the quality of the weld joint. The pipe string, when being laid, is under great tension and weld joints must, of course, necessarily be sufficiently strong to withstand the high forces imposed on the weld joints. Each time a pipe is welded to another pipe extensive tests are made to ensure that the quality of the weld joint formed is sufficient.

An object of the present invention is to provide an apparatus and method for welding pipes together that is faster at welding pipes together than the known method and apparatus described above but without significantly reducing the quality of weld joint.

According to the invention there is provided a method of laying a pipeline underwater, in which pipe sections are welded together to form the pipeline, the method including the following steps:

holding an end of a pipeline, providing a pipe section for extending the pipeline, arranging the pipe section adjacent to said end of pipeline thereby defining a circumferential joint to be welded, providing a plurality of welding heads, each head having at least one welding torch, and arranging the welding heads around the circumferential joint, welding the pipe section to the pipeline by simultaneously operating the welding heads and moving said heads along the circumferential joint, wherein the pipe section is made of steel having a carbon content of less than 0.1% by weight, and during the welding step the pipes are cooled in the region of the circumferential joint by means of introducing a cooling liquid into contact with an interior surface of the pipes.

In the following description it will be understood that the term pipe includes either or both of the pipeline and/or said pipe section.

It has been previously proposed to speed the welding process by simultaneously welding with a plurality of welding heads angularly spaced apart and around the pipe (see for example our international application published under number WO 00/38871-application number PCT/EP99/10504). However, it has been found that welding with more than one welding head can lead to problems associated with an increase in temperature of the weld pool. When welding with a single welding head, successive layers of welding material are laid as the welding head traverses the entire circumference of the joint between the pipes. The weld formed at a given point along the joint therefore cools during the time it takes the welding head to travel 360 degrees around the pipes before the next layer of weld material is laid. If two welding heads are used instead of one, each of the two heads travelling at the same angular velocity and welding at the same rate as that of a single head, the welding time is halved, but the cooling time (the time between laying down successive layers) is also havled. If more torches are used in order to reduce the welding time the cooling time between laying successive layers is also reduced. There is therefore a limit to the number of welding heads that can be used at a given individual rate of operation before the temperature of the weld on successive welds becomes so high that the quality of the weld is adversely affected. Welding with sustained high weld temperatures may also cause other problems such as, for example, the laying down of the cap weld (the layer deposited during the last weld pass) becomes more difficult, the safety of the weld operators may be more prone to failure or poor performance due to overheating of components of the welding equipment, pipe coatings (material coating the interior and/or exterior of the pipe), if any are present, may be damaged, and some NDE (non-destructive examination) testing methods for testing the quality of the weld may need to be delayed as the pipe cools down.

Two ways in which an increase in temperature can lead to a reduction in quality of the weld will now be discussed. Firstly, when J-laying pipelines the axis of the pipes to be welded is vertical or close to vertical. If the weld pool temperature is too high, the surface tension of the molten weld pool may be so low that the shape of the weld pool is deformed under the force of gravity to such an extent that the joint is adversely affected, since gravity effectively pulls the weld pool away from the end face of the upper pipe section defining one wall of the circumferential joint. At very high temperatures the weld pool may even flow away from that wall and even out of the joint. Problems associated with a reduction in surface tension are exacerbated when the axis of the pipes to be welded is inclined relative to a notional vertical axis. Secondly, if relatively high temperatures are maintained, the mechanical properties of the welded material once finally cooled may be affected detrimentally. The steel from which pipe sections have in the past been manufactured have had, at a microscopic level, a structure comprising crystal grains of a relatively small size, which structure is associated with good mechanical properties. At high temperatures, grain sizes may increase leading to the mechanical properties being detrimentally affected.

There has however been a prejudice in the art against directly cooling the pipe during operation of the welding head. It had been thought that cooling methods used during welding would detrimentally affect the mechanical properties of the weld. For example, cooling hot welded joints too quickly could in the prior art methods cause the pipeline to become brittle in the regions of the welded joints between pipe sections. Moreover, it has been common practice to pre-heat pipe sections prior to welding to avoid the mechanical properties of the weld from being affected detrimentally by the weld material cooling too quickly. Also, techniques for preventing the welding equipment from getting too hot have relied on directly cooling the welding torch by pumping coolant via pipes through the welding torch. However, according to the present invention the pipe sections used are made from relatively low or medium carbon steel and as such there is much less chance of the mechanical properties of the weld being deteriorated through rapid cooling compared with the prior art methods using pipe sections having carbon content greater than 0.1% by weight. Furthermore, it is undesirable to introduce significant volumes of liquid into the interior of the pipeline. However the amount of liquid introduced into the pipeline by virtue of practicing the method of the present invention may be sufficiently small that the benefits of the present invention far outweigh any detriment to be had from introducing liquid into the pipeline.

It will be appreciated that during the welding of the pipe section to the pipe line it is not necessary to operate all the welding heads all of the time. In particular, it may be preferred to operate fewer welding heads when depositing the last layer of welding material (commonly referred to as the cap weld). It may even be preferred to operate only one welding torch when laying down the cap weld.

The interior surface of the pipeline with which the cooling liquid initially contacts may be either above or below the circumferential joint. Alternatively cooling liquid may be directed against interior surfaces of the pipeline both above and below the circumferential joint.

The method of the present invention is of particular advantage when laying pipelines using the "J-lay" technique. The pipeline, at the end of the pipeline nearest the water surface, may be at an angle to a notional vertical axis of less than 50 degrees. The axis of the pipes to be welded may be at an angle of less than 50 degrees to the vertical. As mentioned above welding together pipes at an angle near to vertical can present problems when the temperature of the weld stays too high. The method is advantageously used to weld a pipe section to a pipeline, the end of which being at an angle to a notional vertical axis of less than 20 degrees, and more preferably at 10 degrees or less.

The method of the present invention is also of particular advantage when laying pipelines having relatively thick walls. In general, as the thickness of the pipe wall increases, the time required to weld a pipe section to the pipeline increases. When welding pipes together having relatively thicker walls it is therefore more likely that the weld joint will become sufficiently hot as to cause problems associated with the sustained high temperatures. The method is advantageously used to weld a pipe section to a pipeline, wherein the average thickness of the metal wall of the pipe section is greater than or equal to 20 mm. The method is of greater advantage when the average thickness of the metal wall of the pipe section is greater than or equal to 25 mm, and even greater advantage when the average wall thickness is greater than or equal to 30 mm. The method may even be used to advantage when the thickness is greater than or equal to 40 mm.

The circumferential joint may be in the form of a circumferential groove formed between the ends of the pipes to be welded together, each end having been bevelled beforehand.

Preferably, the pipe sections are made of medium carbon steel. Insofar as the present invention is concerned medium conent of between 0.025% and 0.075% by weight. More preferably the steel has a carbon content of between 0.04% and 0.06% by weight. Low or medium carbon steels may have mechanical properties not well suited to forming pipe sections for pipelines. However, the mechanical properties (for example the tensile strength) may often be improved by means other than increasing the carbon content of the steel. For example, the pipe sections provided in the method are advantageously made from steel manufactured using the Thermal Mechanical Control Process (commonly called TMCP steel) and preferably also incorporating the manufacturing technique having an Accelerated Cooling system (the steel thus produced being known as "TMCP-AC steel").

The temperature in the region of a weld pool (the region of molten metal on which a given welding torch operates) generally exceeds 1400 degrees Celsius. It has been found that problems occur if, when welding two pipes together, temperatures in and around the circumferential joint are maintained above 400 degrees Celsius for extended periods of time. According to the present invention, the weld is advantageously cooled from such a high temperature to a significantly lower temperature before being operated on by another welding head. The step of cooling the pipes is preferably performed such that the surface temperature of the welded material formed by a given welding head at least one local region falls from a temperature of greater than 1000 degrees Celsius to below 300 degrees Celsius, more preferably to below 250 degrees Celsius and yet more preferably to below 200 degrees Celsius, before the next time at which the same welding head welds over the same local region. Preferably, the step of cooling the pipes in the region of the circumferential joint is performed such that throughout the welding step there is always at least one region along the circumferential joint having a temperature below 300 degrees Celsius, more preferably below 250 degrees Celsius and, yet more preferably below 200 degrees Celsius. The step of cooling the pipes in the region of the circumferential joint is preferably performed such that the average temperature of a cross-section of the pipe section at a distance of 100 mm above the circumferential joint is preferably less than 100 degrees. Moreover, the step of cooling the pipes in the region of the circumferential joint is preferably performed such that the average temperature of a cross-section of the pipe section at a distance of 75 mm above the circumferential joint is less than 150 degrees Celsius and, more preferably, is performed such that average temperature is less than 140 degrees Celsius, and even more preferably less than 130 degrees. Preferably, the step of cooling the pipes in the region of the circumferential joint is performed such that the average temperature of a cross-section of the pipe section at a distance of 32 mm above the circumferential joint is less than 250 degrees Celsius and more preferably less than 225° C. and yet more preferably less than 200° C.

The temperatures on the pipe referred to above can conveniently be measured by means of a "K-type" thermocouple linked to a suitably configured and calibrated signal amplifier, the centre of the thermocouple surface being positioned at the relevant distance from the circumferential joint. The size of the area of contact of the thermocouple may be as large as 25 mm by 25 mm.

The thermocouple mentioned above may be linked to a data logging unit, provided to make an electronic log over time of various other welding parameters measured. Such data may after welding be analysed. For example, the data may be analysed during testing of a given method of welding to ensure that the welding method complies with given criteria (for example, criteria set to assess whether a given method of welding would be satisfactory in the field). Thus, at least one parameter relating to the welding is advantageously measured and electronically logged over time, said at least one parameter preferably including the temperature of the pipe at a given region on the pipe. The logging of the parameter(s) is preferably conducted before, during and after the step of welding.

In the case where temperature is measured and logged during the method, at least one, but preferably at least three sensors, may be provided to measure the temperature of the pipe. The or each temperature sensor may be placed in direct contact with the pipe. Conveniently, the or each sensor is positioned in the interior of the pipe, preferably mounted on a clamp used for holding one of the pipes to be welded in place. The or each sensor may be resiliently mounted so that the or each sensor is urged into contact with the surface of the pipe. The or each temperature sensor is preferably mounted at a distance from the circumferential joint such that the centre of each sensor is between 10 mm and 100 mm, preferably between 25 mm and 75 mm, away from the joint. Preferably, all of the temperature sensors are place at substantially the same distance from the circumferential joint. Such temperature sensors may be in the form of thermocouples as mentioned above.

Other parameters may be measured. Preferably, at least a plurality of the following parameters are measured during the performance of the method: pressure of the cooling liquid, rate of flow of the cooling liquid, pressure and/or rate of flow of other cooling fluids supplied and/or any shielding gas supplied, welding voltage, current, torch speed, welding arc oscillation frequency, welding arc oscillation amplitude (or width). The results of some or all of those parameters measured are preferably also logged electronically, possibly being processed prior to logging. Values relating to the measured parameters are conveniently measured periodically, preferably many times a second.

The step of cooling the pipes in the region of the circumferential joint is preferably performed such that the average temperature of the weld immediately after the weld has been completed is less than 300° C. and more preferably less than 250° C. and yet more preferably less than 200° C. Also, the step of cooling the pipes in the region of the circumferential joint is preferably performed such that the maximum temperature reached during welding on the outside of the pipe at a distance of 37 mm from the joint is less than 250° C. and more preferably less than 200° C. The step of cooling the pipes is also preferably performed such that the maximum temperature reached during welding on the interior surface of the pipe at a distance of 32 mm from the circumferential joint is less than 200° C. and more preferably less than 150° C. Preferably, the maximum temperature reached during welding on the exterior surface of the pipe at a distance of 22 mm from the circumferential joint is less than 250° C.

The method is of particular advantage when during the welding step at least some welded material in the circumferential joint has a temperature greater than 1500 degrees Celsius.

Advantageously, the cooling liquid comprises water. Preferably, the cooling liquid is water, preferably demineralised water. In the case where the pipe section is at an angle to the vertical of less than 50 degrees the water will on contact with the interior walls (or other hot surfaces within the pipe-line and associated with the welding process), if they are sufficiently hot, evaporate into steam and pass up the interior of the pipe section. The interior walls may, at a given distance away from the circumferential joint being welded, be of a sufficiently cool temperature to cause the steam to condense into water, whereupon such water will flow down the pipe towards the circumferential joint being welded and re-evaporate. The cooling effect of the water is therefore especially advantageous if the method is implemented in such a way as to produce that effect. Such an effect makes the choice of water as a cooling liquid a surprisingly good one.

The cooling liquid may alternatively comprise other liquids, such as alcohol, or any other suitable liquid.

Advantageously, the cooling liquid contacting the interior surfaces of the pipeline is an atomised liquid. For example, the atomised liquid may be in the form of a spray of relatively small droplets of cooling liquid. Preferably, the atomised liquid is in the form of a fine spray of liquid covering a relatively large area of the interior wall of the pipe in an even and steady manner. Thus no one region of the pipe is cooled at a rate much faster relative to other regions of the pipe. It is believed that if a given region of the pipe were cooled very quickly compared to other regions, the mechanical properties of the weld might be detrimentally affected. Preferably, the cooling liquid is sprayed out of a plurality of nozzles. Using a plurality of nozzles enables the cooling liquid to be supplied to the interior wall of the pipe in an even and steady manner. The number of nozzles may be between 5 and 12. The optimum minimum number of nozzles will depend on various factors including, for example, the diameter of the pipes to be welded. For relatively small diameter pipes as few as 4 nozzles may be provided. When the method is performed with pipes of greater diameters more nozzles are preferably provided. Preferably, there are at least 6 nozzles. More preferably, there are at least 8 nozzles. There may be 10 or more nozzles.

Preferably, the maximum angle of any given cross-section, containing the axis of the nozzle, of the liquid sprayed out of a nozzle is greater than 80 degrees and preferably greater than 100 degrees. The angle may for example be about 120 degrees or more. The shape defined by the liquid as it is sprayed out of the nozzles may, in the region close to a nozzle, be relatively planar, the shape being such that the spray is generally aligned with and directed towards the circumferential joint. Alternatively, the shape may be generally conical. The solid angle at which the liquid is sprayed out from each nozzle may be greater than 1 steradian, is preferably greater than 2 steradians, and more preferably, the angle is greater than 3 steradians.

The diameter of each nozzle at the region from which the liquid is sprayed may be 2 mm or less and may, for example, be about 1 mm in diameter.

Preferably, a plurality of the nozzles are arranged in fixed relation to one another. A plurality of the nozzles may be arranged as a ring of nozzles, which may be in fixed relation to one another. The nozzles are conveniently provided on an internal clamp used to assist in the aligning of, and/or clamping of, the pipeline and the pipe section in substantially fixed relation to one another.

The apparatus provided to implement the method may be such that the cooling liquid may flow along at least one conduit from a source to the interior of the pipeline. The pressure of the cooling liquid in the conduit is preferably at least 0.5 bar (50,000 Pa) above atmospheric pressure. For example, the pressure of the cooling liquid in the conduit may be about 2 bar, that is about 1 bar (100,000 Pa) above atmospheric pressure. As mentioned above, it is desirable to keep the volume of liquid introduced into the pipeline to a minimum. The method may however, be such that the pipeline at a rate of greater than 1 liter per minute, for example at a rate of greater than 2 liters per minutes.

Preferably, during the welding step the volume of cooling liquid introduced into the pipeline is less than 15 liters, and more preferably less than 10 liters. For example, during the welding step the volume of cooling liquid introduced into the pipeline may even be about 8 liters or less. Of course, the amount of liquid that remains in the pipeline may be less than that introduced, because some of the liquid may escape as vapor. Preferably, less than 15 liters, and more preferably about ten liters or less, of cooling liquid are introduced into the pipeline per each pipe section that is added. The method is preferably performed such that the welding step may be performed in less than 8 minutes and more preferably in about 6 minutes or less. Preferably, the cooling liquid is supplied for a period of less than 8 minutes per pipe section added and more preferably less than 6 minutes. The cooling liquid, when supplied is preferably supplied at a rate of between 0.5 and 4 liters per minute. The cooling liquid may be supplied at a rate of between 1 and 3 liters per minute, and more preferably about 2 liters per minute.

Advantageously, the cooling liquid is introduced only after a root weld has been completed. It is believed that actively cooling the root weld (the first weld laid down in the circumferential joint) immediately after it is formed may in some circumstances significantly reduce the quality of the weld. The forming of a high quality root weld is of great importance. Preferably, therefore the cooling liquid is introduced only after at least 3 layers of welded material have been deposited. Before cooling liquid is introduced and after the root weld has been completed the pipes may be cooled in the region of the circumferential joint by means of introducing a cooling gas. Cooling with a gas from the inside of the pipes is not as effective as cooling with a liquid, but is easier to control at low cooling rates. Introducing a cooling gas may assist the cooling of the welded layers formed immediately after the root weld at a rate of cooling that is not so fast that it might reduce the quality of the weld formed. The cooling gas used may conveniently be air. Also, the cooling gas may conveniently be passed out of the same plurality of nozzles out of which the cooling liquid is passed.

The method may for example be carried out such that for the first and at least the subsequent welding pass no active cooling is carried out, thereafter for at least one and preferably a plurality of passes cooling with gas from the inside of the pipes is conducted and thereafter the cooling liquid is introduced.

After the welding step has been completed the weld is commonly inspected by non-destructive testing (N.D.T.). For example, ultrasonic sound techniques are commonly used to test the quality of welds formed when laying a pipeline. Such equipment may use a liquid, such as for example water, as an interface between the surface of the weld or pipe and the equipment. For such interface liquids not to evaporate the pipe surface needs to be at a sufficiently low temperature. Also the testing equipment or techniques used may require the pipe to be below a certain temperature in order to function correctly for other reasons. The method is therefore preferably performed such that cooling liquid continues to be introduced into the pipeline after the welding step has been completed. Thus NDT may be carried out sooner. Preferably, the welding and cooling steps of the method of the present invention are performed such that cooling with cooling liquid is continued after the welding has been completed, preferably such that the temperature of the weld joint, after a period of time equal to 50 percent of the welding time has elapsed after the welding has been completed, is less than 250° C., more preferably less than 200° C. and yet more preferably about 150° C. or less.

Preferably, more than 4 welding torches are provided. Preferably, more than 2 welding heads are provided. The details of the construction of the welding head or heads are not generally a significant part of the present invention. Whilst it is possible to employ an arrangement in which each welding head comprises a single welding torch, it is preferable that each welding head comprises a plurality of welding torches because this enables the welding step to be performed faster. For example, each welding head may comprise two welding torches. The welding torches of the same welding head are preferably arranged to be moved around pipe sections in a fixed relationship to one another; it is, however, possible for there to be some limited relative movement of the welding torches belonging to the same welding head. In a preferred embodiment of the present invention there are 3 welding heads each having 2 welding torches.

The method advantageously further includes the steps of providing a rotary equipment holder mounted for rotation about a generally vertical axis and having a central opening through which pipe sections are able to pass as the pipeline is laid, the plurality of welding heads being angularly spaced about the rotary equipment holder, each head being associated with a respective sector of the rotary equipment holder, and fixing a welding head guide assembly around the pipe section or the pipeline, the guide assembly including a guide track for guiding movement of each of the welding heads around the pipe section, the respective sector of the rotary equipment holder being able to revolve around the pipe section as the associated welding head revolves relative to the rotary equipment holder to be reduced or eliminated. That feature makes is possible to operate a pluratliy of welding heads simultaneously around the pipeline thereby enabling the welding process to be speeded up considerably. At the same time the provision of the rotary equipment holder makes it possible to operate a plurality of welding heads without a risk of one welding head interfering with the operation of another. Preferably, the method includes the step of rotating the rotary equipment holder during the simultaneous operation of the welding heads to limit any variation in the position of each welding head relative to the rotary equipment holder.

Such a rotary equipment holder is described in further detail in our international application published under number WO 00/38871,the contents of which are hereby incorporated herein by reference thereto. The features to which claims 2 to 17 and 20 to 22 of that international application (as published) relate can be implemented to advantage in the aspect of the present invention which includes the use of a rotary equipment holder.

According to the present invention there is also provided a welding apparatus for welding pipe sections together to form an underwater pipeline in accordance with the above-described method, the apparatus including a pipe holding means able to hold the end of the pipeline and enabling the pipe section to be arranged adjacent to said end of pipeline thereby defining the circumferential joint to be welded, a plurality of welding heads, each head having at least one welding torch, for welding the pipes together in the region of the circumferential joint, and cooling means able to introduce a cooling liquid into contact with an interior surface of the pipeline during the welding step thereby cooling the pipes in the region of the circumferential joint.

The apparatus is advantageously arranged to be able to perform a method according to any of the aspects of the invention described above. For example, the cooling means may advantageously be in the form of a plurality of nozzles. Of course, the cooling means could take other suitable forms. The pipe holding means may for example comprise a combination of clamps and/or tensioning rollers, or other suitable means.

The invention yet further provides a pipe-laying kit comprising a pipe welding apparatus as described above and a plurality of pipe sections, wherein each pipe section is made of steel having a carbon content of less than 0.1% by weight. The pipe-laying kit is preferably installed on a vessel, for example, a pipe-laying ship.

The invention still further provides an underwater pipeline including a series of pipe sections welded together by a method as defined above.

The invention as described above refers to the use of a cooling liquid. The present invention may however be performed using a cooling gas instead of a cooling liquid. Accordingly, the present invention yet further provides a method of laying a pipeline underwater, in which pipe sections are welded together to form the pipeline, the method including the following steps:

holding an end of a pipeline, providing a pipe section for extending the pipeline, arranging the pipe section adjacent to said end of pipeline thereby defining a circumferential joint to be welded, providing a plurality of welding heads, each head having at least one welding torch, and arranging the welding heads around the circumferential joint, welding the pipe section to the pipeline by simultaneously operating the welding heads and moving said heads along the circumferential joint, wherein the pipe section is made of steel having a carbon content of less than 0.1% by weight, and during the welding step the pipes are cooled in the region of the circumferential joint by means of introducing a cooling fluid into contact with an interior surface of the pipeline. The cooling fluid may be a gas, such as for example, air, or alternatively may be a liquid, such as for example, water, or may even be a combination of liquid and gas. The cooling fluid may initially be a gas (for example, during a plurality of weld passes after the root weld) and thereafter may be a liquid (for example, an atomised liquid).

Figure 2:
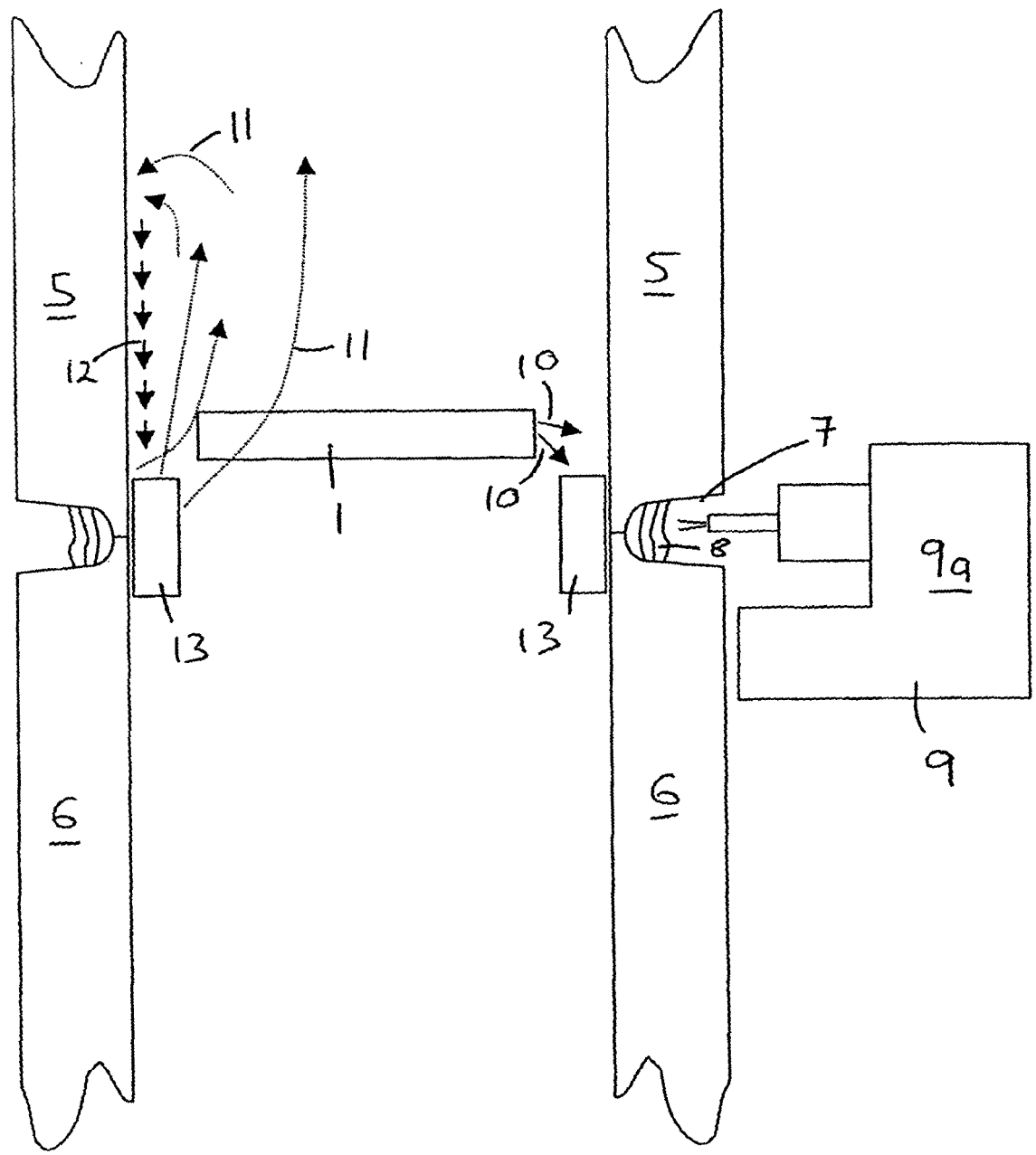
Figure 3:
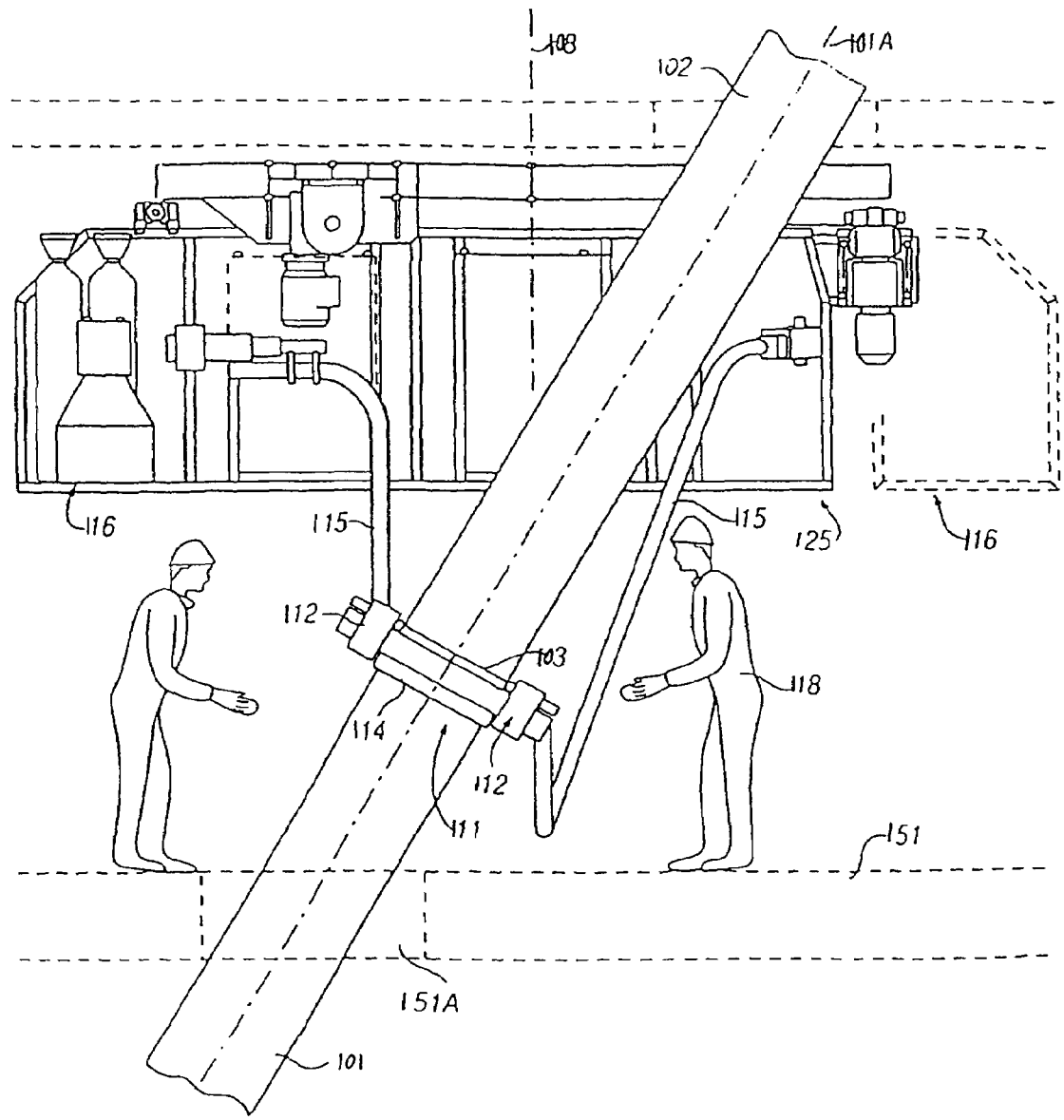
Figure 4:
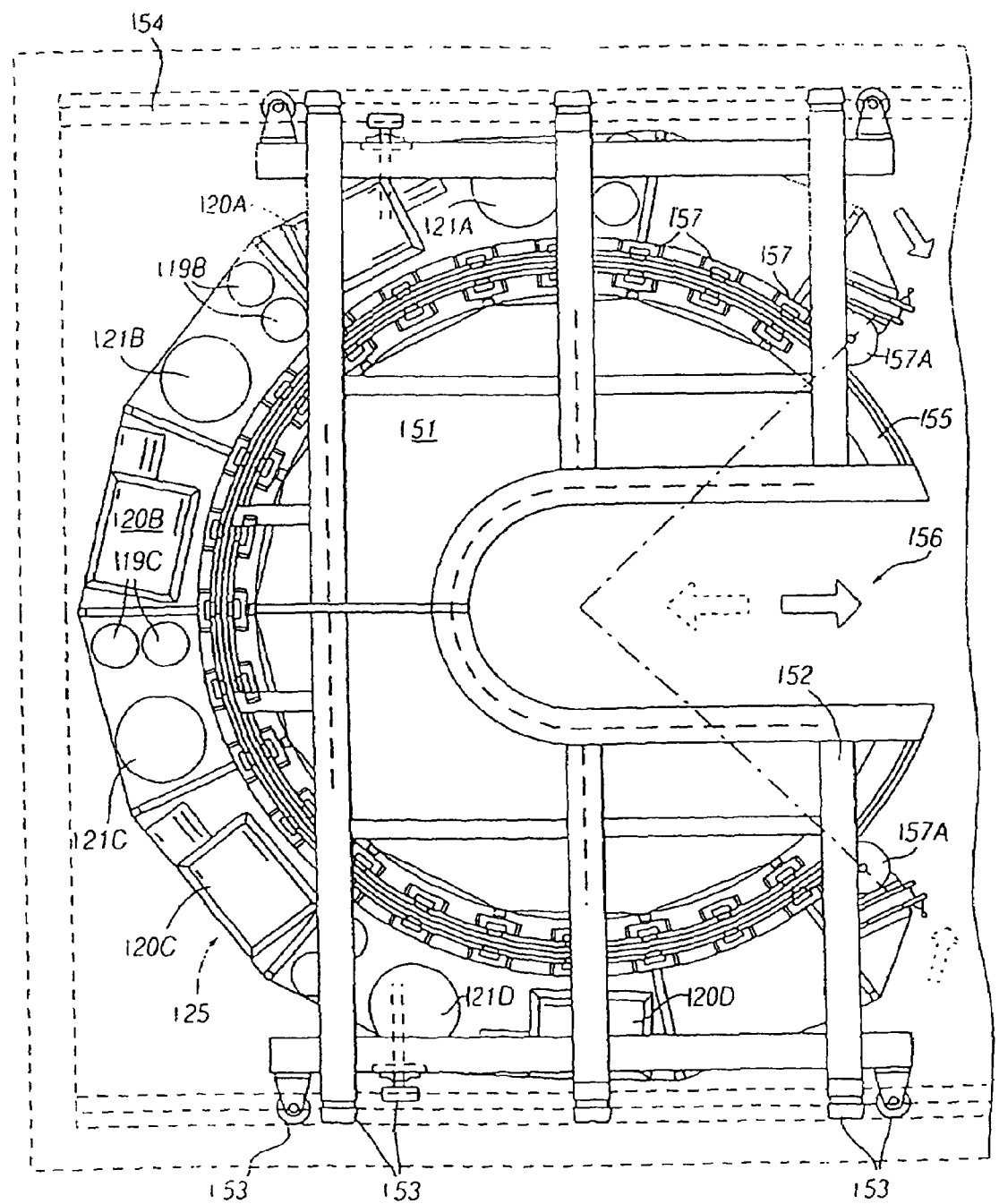
Figure 5:
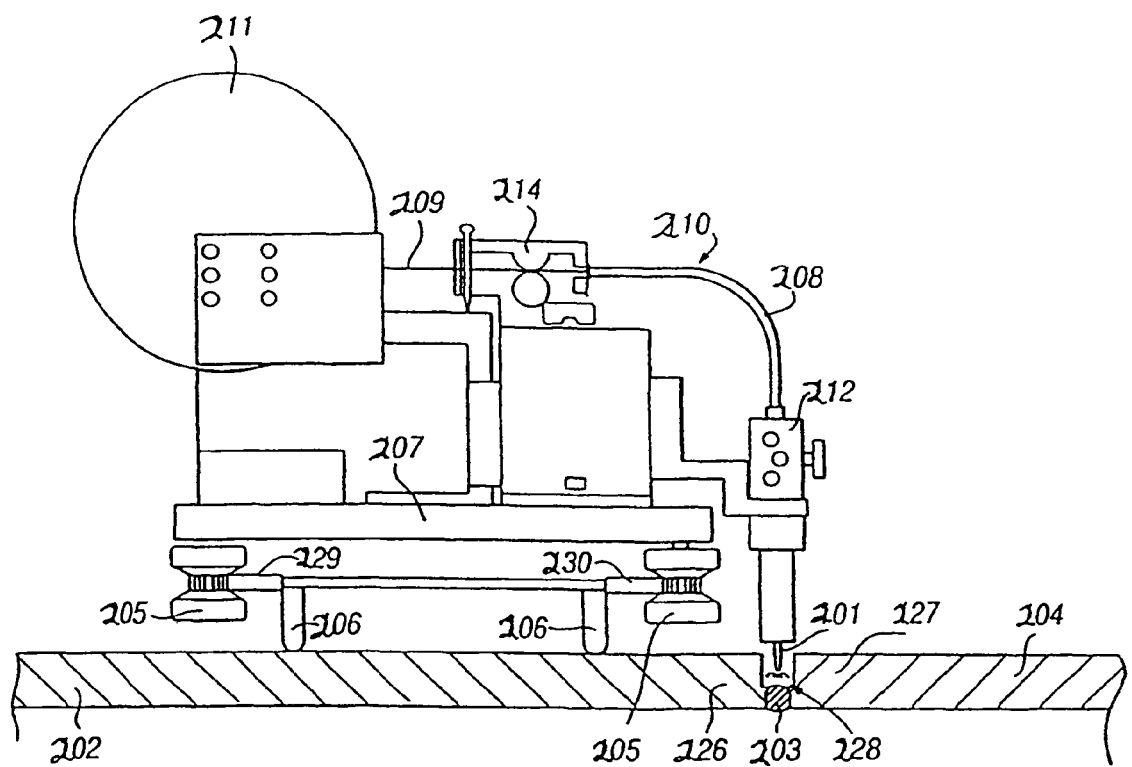
Figure 6:
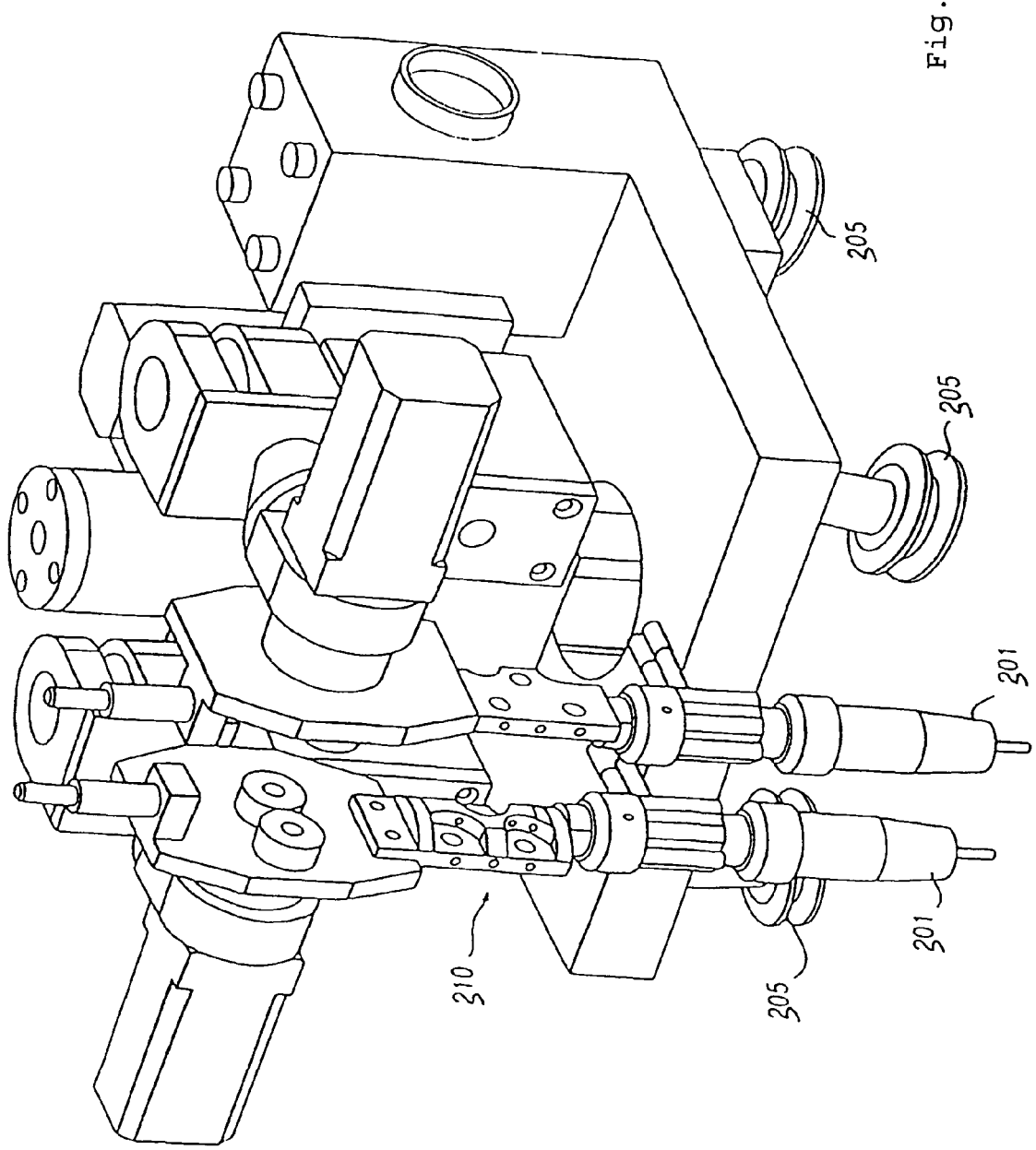

By way of example embodiments of the invention will now be described with reference to the accompanying drawings, of which:

FIG. 1 is a schematic drawing including a plan view of a water cooling ring,

FIG. 2 is a schematic drawing showing the operation of the cooling ring of FIG. 1 inside a pipeline, FIG. 3 is a side view showing the bottom of a pipe section being welded onto the top of a pipeline using a rotary table in the form of an overhead carousel as a rotary equipment holder, FIG. 4 is a plan view of the overhead carousel during the welding shown in FIG. 3, FIG. 5 is a schematic side view of a welding apparatus including two welding torches (only one of which is shown for the purpose of clarity), and FIG. 6 is a schematic perspective view of a modified form of welding apparatus including two welding torches.

FIG. 1 shows a schematic plan view of a cooling ring 1. The ring 1 comprises ten nozzles 2 (only eight of which are shown in FIG. 1 for the sake of clarity; the drawing is schematic) having outlets 2a, each nozzle 2 being connected via a line 3 to a coolant distributor and pump 4. (In the particular example illustrated the number of lines equals the number of nozzles, but it will of course be appreciated that less lines 3 could be provided; for example, one line could feed each nozzle in series). The coolant distributor and pump 4 is connected to a source of water and air (not shown). The outlet 2a of each nozzle 2 (shown schematically in FIG. 1) is about 1.5 mm in diameter. The cooling ring 1 is fixedly mounted on an internal clamp (not shown) used to clamp a pipe section 5 to be welded to the end of a pipeline 6 to extend the pipeline 6 (see FIG. 2). In FIG. 2, one ring 1 is shown in a position just above a groove 7 defined by the ends of the pipes 5, 6. It will of course be appreciated that the ring could, if desired, be positioned nearer the groove, or below the groove, or that a further ring may be provided. The cooling ring 1 is used in a method of laying a pipeline using the J-lay technique, the pipeline being made from pipe sections each being made from TMCP-AC medium carbon steel. In use, the cooling ring 1 is arranged inside the pipeline 6 (as can be seen in FIG. 2).

The shape of the groove 7 (illustrated schematically in FIG. 2 for the sake of clarity) may be such that the walls defining the groove are separated by an angle of 5 degrees or less, for example about 3 degrees. The walls of the groove are therefore near to parallel.

With reference to FIG. 2, during welding, weld material 8 is laid down in the groove 7 by welding heads 9, the heads 9 passing around the pipes and along the groove 7. The walls of the pipe section 5 and pipeline 6 are 32 mm thick in the regions of substantially constant thickness. Each welding head 9a passes over the same part of the groove 7 more than once in order to lay down more material 8 and, finally, to fill the whole of the groove 7 and provide a strong weld between the two pipes 5, 6.

FIG. 3 is a side view of a welding station on a vessel that is designed to lay pipelines using the J-lay technique. The pipeline is arranged to leave the vessel that is laying it in a substantially upright orientation and the pipeline then curves round to a horizontal orientation at the seabed. In J laying, although the pipeline may be completely vertical on the vessel, it is more common for it to be inclined to the vertical, especially if the depth of the water in which the pipeline is being laid is relatively not very great. When J laying, it is necessary to add extra pipe sections to the pipeline with the pipe sections oriented substantially vertically; thus it is not possible to have a whole series of welding stations along the length of the pipeline and it is important that the process of welding another pipe section (which may itself comprise a plurality of individual pipe lengths welded together) onto the pipeline can be carried out as quickly as possible.

In FIG. 3, reference numeral 101 designates the upper end of the pipeline being laid and reference numeral 102 designates the lower end of a pipe section 102 that is being welded to the pipeline 101. The pipeline 101 is held in position relative to the vessel by a suitable combination of clamps and/or tensioning rollers (not shown) mounted on the vessel and, during the welding process, the pipeline 101 is held in a fixed position relative to the vessel. Those clamps include an internal clamp on which the cooling ring 1 (see FIGS. 1 and 2) is mounted. The pipe section 102 is held by clamps in coaxial alignment with the upper end of the pipeline 101 and with the bottom of the pipe section 102 and the top of the pipeline 101 abutting one another and defining a circumferential groove 103 around the exterior of their junction (as already described with reference to circumferential groove 7 shown in FIG. 2).

A welding assembly 111 is fixed around the top of the pipeline 101. The welding assembly comprises a circular guide track 114 extending around the pipeline just below the groove 103 and, in this example, two welding heads 112 at diametrically opposite positions. The welding heads 112 are mounted for movement around the guide track 114 and their movement is carefully controlled. Each welding head is itself of special construction as described below with reference to FIGS. 5 and 6.

Each welding head 112 is connected by an umbilical flexible connector 115 to its own supply equipment 116 which is suspended from an overhead carousel 125 which is rotatable about a vertical axis 108 which intersects the longitudinal axis 101A of the upper end of the pipeline 101 and is inclined to it. In the particular example illustrated the angle of inclination is 20°, but it will be appreciated that this angle may vary.

A platform 151 is provided below the carousel on which users of the equipment may stand. The platform 151 has a central opening 151A through which the pipeline 101 passes. The platform 151 remains stationary as the welding heads and supply equipment suspended from the carousel rotate, so that a user wishing to watch a welding head must walk round the platform 151.

The supply equipment 116 comprises gas cylinders (including some containing argon and some containing carbon dioxide), electrical generating equipment for providing the electrical power required by each welding head and other equipment as required. That other equipment may include a supply of welding wire which is fed to the respective welding head through the connector 115.

As can be seen most easily in FIG. 4, the overhead carousel 125 is mounted on a frame 152 which is slidably mounted via wheels 153 on a fixed support frame 154 shown in dotted outline in FIG. 4, whereby the carousel 125 can be moved horizontally away from its operative position, shown in FIGS. 3 and 4, to a position clear of the pipeline 101. That may be useful, for example, if it is desired to carry out other operations on a pipeline joint.

The frame 152 carries a circular guide track 155 interrupted in one region 156 to allow the guide track to be withdrawn horizontally on the frame 152 even when there is a pipe section passing vertically through the track. The carousel 125 is mounted for rotation on the guide track 155 by wheels 157 most of which rotate about horizontal axes but two of which (referenced 157A in FIG. 4) rotate about vertical axes. It will be understood that, although the guide track extends around only part of the pipe section, the carousel 125 is able to rotate through a full 360°.

The carousel 125 shown in FIGS. 3 and 4 is equipped for the operation of four welding torches (in this particular example two welding heads, each of which has two torches). The carousel thus has four sets of supply equipment including gas cylinders 119A, 119B, 119C and 119D for each of the welding heads, electrical control and/or generating equipment 120A, 120B, 120C and 120D and welding wire supplies 121A, 121B, 121C and 121D.

The procedure for welding a pipe section onto the top of a pipeline will now be described, starting from the situation in which the upper end of a pipeline is fixed in position and a pipe section is held by clamps in abutment with and coaxially aligned with the upper end of the pipeline and a welding assembly is fixed in position such that the welding torches of the welding heads are aligned with the groove at the junction of the pipe section and the end of the pipeline (see FIGS. 3 and 4). The clamps include an internal clamp incorporating the cooling ring 1 illustrated schematically in FIGS. 1 and 2.

The weld between the pipe sections can be formed in one continuous operation. Each of the welding heads 112 is driven on its respective carriage around the guide track 114 at the same rotational speed. At the same time the carousel 125 is driven at substantially the same rotational speed around the axis 108. Thus the supply equipment 116 for each head 112 remains substantially radially aligned with its head; as a result of the inclination of the pipeline, there is some movement of the head towards and away from the equipment 116 but that is accommodated by movement of the flexible connector 115.

Initially, as already described, weld material is laid down in the innermost portion of the groove (this step being know as the root pass), but as rotation continues and one welding head comes to a part of the groove that has already been passed over by another head the weld is built up towards the outermost portion. Successive layers of weld material are laid down in successive passes. Thus with two welding heads each laying down separate layers of weld material each layer of weld material may be laid during 180 degrees of movement of each head around the pipeline, so that for each complete revolution of the welding heads around the pipeline two passes are completed. The weld material last laid down is known as the cap and this step (the last pass) is thus known as the cap pass. The laying of the cap weld is however performed by a single welding head.

With reference to FIG. 2, in accordance with known techniques, there is provided an annular copper backing plate 13 mounted on the shoes of the clamp (not shown) provided to hold the upper end of the pipeline 6. The copper backing plate 13 is positioned inside the pipes 5, 6 so that it covers the joint between the pipes 5, 6. The copper backing plate 13 is provided to assist with the laying down of the root weld and at least the second layer of weld material. The backing plate 13 is removed after the initial layers of weld material have been deposited.

With reference to FIGS. 1 and 2, during the root pass (i.e. the first pass) no cooling fluid is passed out of the nozzles 2. As soon as the second pass has been completed (i.e. two layers of weld material have been laid down which is usually after about 70 to 100 seconds) air is passed out of the nozzles 2 towards the inner surface of the pipeline. The air, initially at ambient temperature, is pumped from the coolant distributor and pump 4 via lines 3 to the nozzles 2 and from the nozzles towards the groove 7. The air aids the cooling of the pipes in the region of the groove 7 in a relatively gentle manner. At this stage the cooling of the weld material is mostly by means of heat being conducted away by the pipes themselves.

Once the fourth weld pass has been completed, which is usually after about 130 to 160 seconds instead of pumping air to the nozzles, water is pumped to the nozzles 2 (the situation illustrated by FIG. 2). The water exits the nozzle outlets 2a as atomised water and is directed generally towards the groove 7 (directed generally downwards as viewed in FIG. 2) as is illustrated in FIG. 2 by arrows 10 (only shown on the right hand side of FIG. 2 for the sake of clarity). The angle of the notional cone defined by the spray of the water (near the exit of the nozzle) is about 120 degrees. Water is sprayed evenly over a relatively large surface area of the interior of the pipeline. The water, initially at ambient temperature, is pumped, at a pressure of about 1 bar above atmospheric pressure and at a rate of about two liters per minute, from the coolant distributor and pump 4 via the lines 3 (the same lines 3 as used to pump the air only) to the nozzles 2. The water aids the cooling of the pipes 5, 6 in the region of the groove 7. In particular, the water on contact with a hot surface of a pipe (or the copper backing plate 13 if still present) evaporates and is converted into steam (represented by dotted arrows 11—only shown on the left hand side of FIG. 2 for the sake of clarity), which passes up the interior of the pipeline. The extra energy taken from the pipeline needed to convert the liquid water into steam further aids the cooling process. The steam cools as it rises and condenses back into water, for example on contact with a cool surface of the pipeline. Such water (represented by arrows 12—only shown on the left hand side of FIG. 2 for the sake of clarity) then passes under the force of gravity down the interior sides of the pipeline 5 and may then re-evaporate on reaching a sufficiently hot interior surface of the pipeline (or the copper backing plate 13 if still present). Such a cycle of evaporation, condensation and re-evaporation further assists the cooling of the pipes 5,6 in the region of the groove 7.

During the welding process the weld pool is at a temperature of about 1500 degrees Celsius, but the interior pipe surface in the region of the groove has regions (which may move as the welding heads move) where the temperature is below 160 degrees Celsius. At a distance of 37 mm from the groove the average temperature at any given time of the pipe is below 240 degrees Celsius on the outside of the pipe and below 150° C. on the inside of the pipe.

After the cap pass has been completed and the welding has therefore stopped, water is still pumped out of the nozzles to cool the pipeline further, so that non-destructive testing (NDT) of the welded joint can be performed. In total over eight liters of water are pumped from the coolant pump and distributor 4 over a period of over 5 minutes.

With reference to FIGS. 3 and 4, during the entire welding process the rotational speed of both the welding heads 112 and the carousel 125 can be constant. If desired, the direction of rotation of the welding heads and the carousel can be reversed periodically, although it will be understood that such reversal is not necessary from the point of view of maintaining the welding heads adjacent to their respective supply equipment. Once the welded joint has been completed, the welding assembly 111 can be released from the pipeline, a further length of pipeline allowed to pass out from the vessel and the process repeated with the top of the pipe section then defining the end of the pipeline.

A welding head will now be described with reference to FIGS. 5 and 6. Referring to FIG. 5, there is shown in partial cross-section the ends of pipes 202, 204 to be welded together and a schematic side view of a welding apparatus 210 having two voltaic arc-welding torches 201 (only one of which can be seen in FIG. 1) for butt welding the pipes 202, 204 together. The welding torch is of the well known GMAW (gas metal arc welding) and can either be of the type used in MAG (metal active gas) welding or of the type used in MIG (metal inert gas) welding. The gas used may for example be carbon dioxide. It should be understood that the welding apparatus 210 corresponds to one of the welding heads 112 shown in FIGS. 3 and 4 and to the welding head 9a shown in FIG. 2 and that the pipes 202, 204 correspond to the pipeline 6 in FIG. 2 (or 101 in FIGS. 3 and 4) and the pipe section 5 in FIG. 2 (or 102 in FIGS. 3 and 4), respectively.

The pipes 202, 204 are arranged with their axes aligned and their ends 226, 227 next to each other. The ends 226, 227 of the pipes are bevelled so that when brought together they define a circumferentially extending exterior groove 228 (groove 7 of FIG. 2 or groove 103 in FIG. 3). A track 206 (corresponding to the track 114 of FIGS. 3 and 4) is fixedly mounted as a single unit on the left hand pipe 202 (as viewed in FIG. 5). The track 206 extends circumferentially around the pipe 202. The track 206 has two guide tracks 229, 230 that extend around the pipe 202. The welding apparatus 210 is mounted for movement along the track 206. Wheels 205 are rotatably mounted on a base plate 207 of the welding apparatus 210. The wheels 205 engage with the guide tracks 229, 230 and facilitate the guided movement of the apparatus 210 along the track 206. One of the tracks 230 also provides a toothed rack that extends around the pipe. A pinion wheel (not shown), mounted for engagement with the rack, is driven so that the apparatus may be driven around the pipe 202. The driven pinion wheel may be rotated via a driven chain, which is in turn driven by a stepper motor, or similar driving source (not illustrated). The track 206 is so positioned on the pipe 202 that the torches 201 of the apparatus 210 are each positioned directly over the groove 228. Such methods of positioning a track and a welding apparatus on a pipe so that a torch of the welding apparatus is correctly positioned over the weld joint to be formed are well known and are therefore not described here in further detail.

In use, the apparatus 210 is driven around the pipes 202, 204 and the welding torches 201 are operated and controlled so that they deposit weld material in the centre of the groove 228 to form a weld joint 203. The weld torches are arranged next to each other. When the apparatus is started up the first torch (the torch at the front in respect of the initial direction of motion of the torches) is operated first and the other torch is not operated until it reaches the start of the weld material deposited by the first torch. Then, as the apparatus 210 passes along the groove 228, weld material is deposited in the groove by the first torch and shortly thereafter further weld material is deposited on top thereof by the second torch, thereby together forming the weld joint 203. The apparatus 210 performs several passes depositing further layers of weld material in the groove to join the pipes together. The welding apparatus 210 may rotate in both directions around the circumference of the pipes 202, 204, if desired. Both torches 201 function in a similar way. The following description relates to only one of the two torches, but it will be understood that the other torch functions in substantially the same way. Welding wire 209 is continuously fed from a spool 211 of wire to the torch 201. The welding wire 209 is unwound from the wire spool 211 by means of a pulling device 214 which conveys the wire 209 via a guiding pipe 208 to a straining device 212, from where the wire is fed into the torch 201. The welding of the pipes 202 and 204, by the welding torch is controlled by an automatic guidance system. A suitable guidance system is described in our international patent application published under number WO 00/38871.The guidance system guides the welding torch by ascertaining electrical parameter values relating to the voltaic arc impedance, but is not described in any further detail here.

FIG. 6 shows schematically a modified form of welding apparatus 310. The apparatus 310 operates in a similar manner to that of the apparatus 210 described above. The welding torches 301 are aligned so that when the apparatus 310 is mounted on a pipe (not shown in FIG. 6) they both point towards the same notional circumferential line extending around the pipe. Wheels 305 are provided for engaging with a guide track (not shown in FIG. 6) that, in use, extends around one of the pipes to be welded. The main differences between the apparatus 310 and the apparatus 210 will now be described. The welding wire (not shown) of the apparatus 310 is not provided on the moving part of the apparatus, rather it is mounted at a location remote from the apparatus, and fed from that remote location, via a guide pipe (for example a connector 115 as shown in FIG. 3), to the welding apparatus as it moves around the pipe. The torches 301 are each water cooled. The water is pumped around a cooling system (not shown) including parts of the torch. The water heated by the operating torch passes into a heat exchanger, such as a radiator, so that it is cooled.

Various experiments have been performed to assess the temperature variations on the pipe when using a cooling method according to the above described embodiment. When welding the pipes together, readings were taken from 10 K-type thermocouples mounted on the pipe's surface, 4 on the internal surface and 6 on the external surface. The thermocouples used each had a measuring surface in contact with the pipe measuring 25 mm by 25 mm. The thermocouples were electrically insulated, the measuring pad (the surface of the thermocouple in contact with the pipe) being welded to the pipe. Signals from each thermocouple were fed to a signal amplifier (an amplifier manufactured by Hottinger Baldwin Messtechnik, the model number being HBM UPM 100). The operational measuring range of each thermocouple was from 22° C. to 400° C. The uncertainty in the measurements taken by the thermocouples was calculated to be of the order of +/−1° C. The temperatures measured were periodically logged electronically, with other parameters relating to the embodiment of the invention including the air water pressure (of the air provided for cooling), and the cooling time. All of the parameters special to the present embodiment were logged on a conventional logging apparatus used to log welding parameters and as such further parameters were also measured and logged, those further parameters including arc voltage, arc current, the calculated heat input and many others.

The thermocouples were mounted in pairs, each pair being separated by 60° around the pipe, the first, second and third pairs being mounted with the centre of the pad of the thermocouples being 22 mm, 37 mm and 87 mm, respectively, from the joint between the pipes on the exterior of the pipe, and the fourth and fifth pairs being mounted with the centre at 32 mm and 87 mm, respectively from the joint on the interior of the pipe. (Each of the distances quoted relates to the distance between the centre of the theromcouple pad and the centre of the joint between the pipes such that the distance of the separation of the near edge of the pad of each thermocouple from the joint of the pipes were, for the aforementioned pairs, 10 mm, 25 mm, 75 mm, 20 mm and 75 mm respectively).

A first experiment used 3 welding heads, each welding head having twin torches, air only being introduced on the third and fourth welding passes and atomised water being introduced on the remaining passes. The cap pass was laid with a single welding torch. The ambient (air) temperature was 16° C. and the pipe had been preheated to 35° C. The pipes were provided by the manufacturers British Steel of United Kingdom and Kawasaki Steel of Japan (i.e. BS/KAW pipes) and pipes and the filler wire used was "Esab 12.66" wire manufactured by the Swedish company ESAB. The welding time was 6 minutes 28 seconds, air only being introduced after 1 minute 28 seconds and water being used after 2 minutes 33 seconds (up to and after the cap weld had been laid). At the end of welding the temperature of the weld measured on the cap was about 125° C. and 3½ minutes thereafter the temperature increased slightly, but remained about the same. The peak temperature reached a) at 22 mm from the joint on the outside of the pipe was about 210° C., b) at 37 mm from the joint on the exterior of the pipe was about 140° C., c) at 87 mm on the exterior of the pipe was about 110° C., d) at 32 mm on the interior of the pipe was about 120° C. and e) at 87 mm on the interior of the pipe was about 100° C.

A second experiment similar to that described above was performed on a pipe from the manufacturers Sumitomo Metal Industries of Japan and Kawasaki Steel (i.e. SUM/KAW pipes) also using "Esab 12.66" filler wire. The ambient temperature in this case was 18° C., the pipe having been preheated to 50° C., air being introduced after 1 minute 44 seconds after welding, water being introduced after 2 minutes 20 seconds, and welding being completed in 7 minutes 55 seconds. At the end of welding the temperature measured on the cap weld was 140° C. After 10 minutes from the start of welding the cap temperature had fallen to about 100° C. The peak temperatures measured thoughout the welding process by the various thermocouples were as follows: a) on the exterior at 22 mm: 230° C., b) on the exterior at 37 mm: 175° C., c) on the exterior at 87 mm: 90° C., d) on the interior at 32 mm: 120° C. and e) on the interior at 87 mm: about 80° C.

Experiments were also performed taking measurements of temperatures when welding without using a cooling system according to the present invention. The cap temperature after welding in such a case was measured to be between 380° C. and 400° C. decreasing after 10 or 11 minutes to about 280° C. to 290° C. The peak temperatures reached during welding corresponding to the above-mentioned positions were on average as follows: a) on the exterior at 22 mm about 310° C., b) on the exterior at 32 mm about 260° C., c) on the exterior at 87 mm about 150° C., d) on the interior at 32 mm about 250° C. and e) on the interior at 87 mm about 130° C.

As will be noted from the temperatures quoted above, the cooling system of the embodiment of the present invention significantly reduces the temperature in the region of the joint. Whilst the experiments referred to above included a step of preheating the pipes, it will be appreciated that such a step is not necessary when performing the method of the present invention.

It will be appreciated that various modifications or improvements may be made to the embodiments of the invention described above without departing from the scope of the present invention. For example, more than two welding heads may be provided. Preferably, three heads are provided, each head having two torches. If three heads are provided, then even if one of them is damaged, the other two may be used simultaneously and that alone enables a considerable increase in welding speed to be achieved.

The cap weld may be deposited by one, two or possibly more than two welding torches.

Rather than providing an overhead carousel 125 a rotating platform, on top of which the equipment is mounted, could be provided in a manner similar to the rotary table illustrated in WO 00/38871. The carousel 125 may be provided as an overhead carousel without providing an arrangement for enabling the carousel to be withdrawn while a pipe section is still present and extending vertically through it.

Appropriate control means may be provided for synchronising the rotation of the carousel 125 and the welding assembly 111 and it will be seen that, if desired, the degree of operator involvement in the process can be very limited.

Rather than simply using water as a cooling liquid, additives could be included in the cooling liquid, or a different cooling liquid could be used. For example, alcohol could form at least a part of the cooling liquid.

Two cooling rings could be used simultaneously, one above the groove and one below.

The invention claimed is:

1. A method of laying a pipeline underwater, in which pipe sections are welded together to form the pipeline, the method including the following steps: holding an end of a pipeline, providing a pipe section for extending the pipeline, arranging the pipe section adjacent to said end of pipeline thereby defining a circumferential joint to be welded, providing a plurality of welding heads, each head having at least one welding torch, and arranging the welding heads around the circumferential joint, welding the pipe section to the pipeline by simultaneously operating the welding heads and moving said heads along the circumferential joint, and laying the pipeline underwater, wherein the pipe section is made of steel having a carbon content of less than 0.1% by weight, and during the welding step the pipes are cooled in the region of the circumferential joint by means of introducing a cooling liquid into contact with an interior surface of the pipes.

2. A method according to claim 1, wherein the average thickness of the metal wall of the pipe section is greater than or equal to 25 mm.

3. A method according to claim 1, wherein the pipe section is made of steel having a carbon content of between 0.025% and 0.075% by weight.

4. A method according to claim 1, wherein the pipe section is made of steel having a carbon content of between 0.04% and 0.06% by weight.

5. A method according to claim 1, wherein the step of cooling the pipes is performed such that the surface temperature of the welded material formed by a given welding head at at least one local region falls from a temperature of greater than 1000 degrees Celsius to below 300 degrees Celsius before the next time at which the same welding head welds over the same local region.

6. A method according to claim 1, wherein the step of cooling the pipes in the region of the circumferential joint is performed such that throughout the welding step there is always at least one region along the circumferential joint having a temperature below 300 degrees Celsius.

7. A method according to claim 1, wherein the step of cooling the pipes in the region of the circumferential joint is performed such that the average temperature of a cross-section of the pipe section at a distance of 32 mm above the circumferential joint is less than 250 degrees Celsius.

8. A method according to claim 1, wherein at least one parameter relating to the welding is measured and electronically logged over time.

9. A method according to claim 8, wherein the temperature of the pipe at a given region on the pipe is measured and electronically logged over time.

10. A method according to claim 1, wherein at least a plurality of the following parameters are measured during the performance of the method: pressure of the cooling liquid, rate of flow of the cooling liquid, pressure and/or rate of flow of other cooling fluids supplied and/or any shielding gas supplied, welding voltage, current, torch speed, welding arc oscillation frequency, welding arc oscillation amplitude (or width).

11. A method according to claim 1, wherein during the welding step at least some welded material in the circumferential joint has a temperature greater than 1500 degrees Celsius.

12. A method according to claim 1, wherein the cooling liquid comprises water.

13. A method according to claim 1, wherein the cooling liquid contacting the interior surfaces of the pipeline is an embed liquid.

14. A method according to claim 13, wherein the cooling liquid is sprayed out of a pluralty of nozzles.

15. A method according to claim 14, wherein there are at least 6 nozzles.

16. A method according to claim 14, wherein the solid angle at which the liquid is sprayed out from each nozzle is greater than 1 steradian.

17. A method according to claim 16, wherein the solid angle is greater than 2 steradians.

18. A method according to claim 14, wherein the diameter of each nozzle at the region from which the liquid is sprayed is less than 2 mm.

19. A method according to claim 14, wherein a plurality of the nozzles are arranged in find relation to one another.

20. A method according to claim 14, wherein a plurality of the nozzles are arranged as a ring of nozzles.

21. A method according to claim 14, wherein the nozzles are provided on an internal clamp used to assist in the aligning of the pipeline and the pipe section in substantially fixed relation to one another.

22. A method according to claim 14, wherein before cooling liquid is introduced and after the root weld has been completed the pipes are cooled in the region of the circumferential joint by means of introducing a cooling gas.

23. A method according to claim 22, wherein the cooling gas passes out of the same plurality of nozzles out of which the cooling liquid is passed.

24. A method according to claim 1, wherein the cooling liquid flows along at least one conduit from a source to the interior of the pipeline and the pressure of the cooling liquid in the conduit is at least 0.5 bar above atmospheric pressure.

25. A method according to claim 1, wherein during the welding step cooling liquid is introduced into the pipeline at a rate of greater than 1 liter per minute.

26. A method according to claim 1, wherein the cooling liquid is introduced only after a root weld has been completed.

27. A method according to claim 1, wherein the cooling liquid is introduced only after at least 3 layers of welded material have been deposited.

28. A method according to claim 1, wherein cooling liquid continues to be introduced into the pipeline after the welding step has been completed.

29. A method according to claim 1, wherein more than 4 welding torches are provided.

30. A method according to claim 1, wherein at least one welding head comprises a plurality of welding torches.

31. A method according to claim 1, wherein the method further includes the steps of providing a rotary equipment holder mounted for rotation about a generally vertical axis and having a central opening through which pipe sections are able to pass as the pipeline is laid, the plurality of welding heads being angularly spaced about the rotary equipment holder, each head being associated with a respective sector of the rotary equipment holder, and fixing a welding head guide assembly around the pipe section or the pipeline, the guide assembly including a guide track for guiding movement of each of the welding heads around the pipe section, the respective sector of the rotary equipment holder being able to revolve around the pipe section as the associated welding head revolves around the pipe section.

32. A method according to claim 31, wherein the method includes the step of rotating the rotary equipment holder during the simultaneous operation of the welding heads to limit any variation in the position of each welding head relative to the rotary equipment holder.

33. A method of laying a pipeline underwater, in which pipe sections are welded together to form the pipeline, the method including the following steps: holding an end of a pipeline, providing a pipe section for extending the pipeline, arranging the pipe section adjacent to said end of pipeline thereby defining a circumferential joint to be welded, providing a plurality of welding heads, each head having at least one welding torch, and arranging the welding heads around the circumferential joint, welding the pipe section to the pipeline by simultaneously operating the welding heads and moving said heads along the circumferential joint, and laying the pipeline underwater, wherein the pipe section is made of steel having a carbon content of less than 0.1% by weight, and during the welding step the pipes are cooled in the region of the circumferential joint by means of introducing a cooling fluid into contact with an interior surface of the pipeline.

34. A method of j-laying a deep-sea pipeline, in which pipe sections are welded together to form the pipeline, the method including the following steps:

holding an end of a pipeline, providing a pipe section for extending the pipeline, arranging the pipe section adjacent to said end of pipeline thereby defining a circumferential joint to be welded, providing a plurality of welding heads, each head having at least one welding torch, and arranging the welding heads around the circumferential joint, welding the pipe section to the pipeline by simultaneously operating the welding heads and moving said heads along the circumferential joint, and j-laying the pipeline underwater, wherein the pipe section is made of steel having a carbon content of less than 0.1% by weight, and during the welding step the pipes are cooled in the region of the circumferential joint by means of introducing a cooling liquid into contact with an interior surface of the pipes.

35. A method of j-laying a deep-sea pipeline, in which pipe sections are welded together to form the pipeline, the method including the following steps:

holding an end of a pipeline, providing a pipe section for extending the pipeline, arranging the pipe section adjacent to said end of pipeline thereby defining a circumferential joint to be welded, providing a plurality of welding heads, each head having at least one welding torch, and arranging the welding heads around the circumferential joint, welding the pipe section to the pipeline by simultaneously operating the welding heads and moving said heads along the circumferential joint, and j-laying the pipeline underwater.

wherein the pipe section is made of steel manufactured using a Thermal Mechanical Control Process and Accelerated Cooling (TMCP-AC), technique, the TMCP-AC steel having a carbon content of less than 0.1% by weight, and during the welding step the pipes are cooled in the region of the circumferential joint by means of introducing a cooling liquid into contact with an interior surface of the pipes.

36. A method of laying a pipeline underwater, in which pipe sections are welded together to form the pipeline, the method including the following steps:

holding an end of a pipeline, providing a pipe section for extending the pipeline, arranging the pipe section adjacent to said end of pipeline thereby defining a circumferential joint to be welded, providing a plurality of welding heads, each head having at least one welding torch, and arranging the welding heads around the circumferential joint, welding the pipe section to the pipeline by simultaneously operating the welding heads and moving said heads along the circumferential joint, wherein the pipe section is made of steel having a carbon content of less than 0.1% by weight, and after the root weld has been completed cooling the pipes in the region of the circumferential joint by means of introducing a cooling gas, wherein the cooling gas is sprayed out of a plurality of nozzles, and after at least 3 layers of welded material have been deposited, cooling the pipes in the region of the circumferential joint by means of introducing a cooling liquid into contact with an interior surface, wherein the cooling liquid is sprayed out of the same plurality of nozzles out of which the cooling gas is passed, and laying the pipeline underwater.

* * * * *

UNITED STATES PATENT AND TRADEMARK OFFICE
CERTIFICATE OF CORRECTION

| | | |
|---|---|---|
| PATENT NO. | : 7,114,881 B2 | |
| APPLICATION NO. | : 10/380271 | |
| DATED | : October 3, 2006 | |
| INVENTOR(S) | : Antonio Belloni et al. | |

It is certified that error appears in the above-identified patent and that said Letters Patent is hereby corrected as shown below:

Column 2, lines 9-44, please amend as follows:

It has been previously proposed to speed the welding process by simultaneously welding with a plurality of welding heads angularly spaced apart and around the pipe (see for example our international application published under number WO 00/38871- application number PCT/EP99/10504). However, it has been found that welding with more than one welding head can lead to problems associated with an increase in temperature of the weld pool. When welding with a single welding head, successive layers of welding material are laid as the welding head traverses the entire circumference of the joint between the pipes. The weld formed at a given point along the joint therefore cools during the time it takes the welding head to travel 360 degrees around the pipes before the next layer of weld material is laid. If two welding heads are used instead of one, each of the two heads travelling at the same angular velocity and welding at the same rate as that of a single head, the welding time is halved, but the cooling time (the time between laying down successive layers) is also havled. If more torches are used in order to reduce the welding time the cooling time between laying successive layers is also reduced. There is therefore a limit to the number of welding heads that can be used at a given individual rate of operation before the temperature of the weld on successive welds becomes so high that the quality of the weld is adversely affected. Welding with sustained high weld temperatures may also cause other problems such as, for example, the laying down of the cap weld (the layer deposited during the last weld pass) becomes more difficult, the safety of the weld operators <u>may be adversely affected, the welding equipment</u> may be more prone to failure or poor performance due to overheating of components of the welding equipment, pipe coatings (material coating the interior and/or exterior of the pipe), if any are present, may be damaged, and some NDE (non-destructive examination) testing methods for testing the quality of the weld may need to be delayed as the pipe cools down.

UNITED STATES PATENT AND TRADEMARK OFFICE
CERTIFICATE OF CORRECTION

| | |
|---|---|
| PATENT NO. | : 7,114,881 B2 |
| APPLICATION NO. | : 10/380271 |
| DATED | : October 3, 2006 |
| INVENTOR(S) | : Antonio Belloni et al. |

It is certified that error appears in the above-identified patent and that said Letters Patent is hereby corrected as shown below:

Column 4, lines 4-19, please amend as follows:

Preferably, the pipe sections are made of medium carbon steel. Insofar as the present invention is concerned medium [[conent]] <u>content carbon steel may be considered as being steel having a carbon content</u> of between 0.025% and 0.075% by weight. More preferably the steel has a carbon content of between 0.04% and 0.06% by weight. Low or medium carbon steels may have mechanical properties not well suited to forming pipe sections for pipelines. However, the mechanical properties (for example the tensile strength) may often be improved by means other than increasing the carbon content of the steel. For example, the pipe sections provided in the method are advantageously made from steel manufactured using the Thermal Mechanical Control Process (commonly called TMCP steel) and preferably also incorporating the manufacturing technique having an Accelerated Cooling system (the steel thus produced being known as "TMCP-AC steel").

Column 6, line 64 to column 7, line 8, please amend as follows:

The apparatus provided to implement the method may be such that the cooling liquid may flow along at least one conduit from a source to the interior of the pipeline. The pressure of the cooling liquid in the conduit is preferably at least 0.5 bar (50,000 Pa) above atmospheric pressure. For example, the pressure of the cooling liquid in the conduit may be about 2 bar, that is about 1 bar (100,000 Pa) above atmospheric pressure. As mentioned above, it is desirable to keep the volume of liquid introduced into the pipeline to a minimum. The method may however, be such that <u>during the welding step cooling liquid is introduced into</u> the pipeline at a rate of greater than 1 liter per minute, for example at a rate of greater than 2 liters per minutes.

UNITED STATES PATENT AND TRADEMARK OFFICE
CERTIFICATE OF CORRECTION

| | | |
|---|---|---|
| PATENT NO. | : 7,114,881 B2 | |
| APPLICATION NO. | : 10/380271 | |
| DATED | : October 3, 2006 | |
| INVENTOR(S) | : Antonio Belloni et al. | |

It is certified that error appears in the above-identified patent and that said Letters Patent is hereby corrected as shown below:

Column 8, lines 26-50, please amend as follows:

The method advantageously further includes the steps of providing a rotary equipment holder mounted for rotation about a generally vertical axis and having a central opening through which pipe sections are able to pass as the pipeline is laid, the plurality of welding heads being angularly spaced about the rotary equipment holder, each head being associated with a respective sector of the rotary equipment holder, and fixing a welding head guide assembly around the pipe section or the pipeline, the guide assembly including a guide track for guiding movement of each of the welding heads around the pipe section, the respective sector of the rotary equipment holder being able to revolve around the pipe section as the associated welding head revolves <u>around the pipe section. Rotation of the rotary equipment holder enables any version of the position of each welding head</u> relative to the rotary equipment holder to be reduced or eliminated. That feature makes is possible to operate a [[pluratliy]] <u>plurality</u> of welding heads simultaneously around the pipeline thereby enabling the welding process to be speeded up considerably. At the same time the provision of the rotary equipment holder makes it possible to operate a plurality of welding heads without a risk of one welding head interfering with the operation of another. Preferably, the method includes the step of rotating the rotary equipment holder during the simultaneous operation of the welding heads to limit any variation in the position of each welding head relative to the rotary equipment holder.

UNITED STATES PATENT AND TRADEMARK OFFICE
CERTIFICATE OF CORRECTION

| | |
|---|---|
| PATENT NO. | : 7,114,881 B2 |
| APPLICATION NO. | : 10/380271 |
| DATED | : October 3, 2006 |
| INVENTOR(S) | : Antonio Belloni et al. |

It is certified that error appears in the above-identified patent and that said Letters Patent is hereby corrected as shown below:

Column 15, lines 18-43, please amend as follows:

Various experiments have been performed to assess the temperature variations on the pipe when using a cooling method according to the above described embodiment. When welding the pipes together, readings were taken from 10 K-type thermocouples mounted on the pipe's surface, 4 on the internal surface and 6 on the external surface. The thermocouples used each had a measuring surface in contact with the pipe measuring 25 mm by 25 mm. The thermocouples were electrically insulated, the measuring pad (the surface of the thermocouple in contact with the pipe) being welded to the pipe. Signals from each thermocouple were fed to a signal amplifier (an amplifier manufactured by Hottinger Baldwin Messtechnik, the model number being HBM UPM 100). The operational measuring range of each thermocouple was from 22.degree. C. to 400.degree. C. The uncertainty in the measurements taken by the thermocouples was calculated to be of the order of +/-1.degree. C. The temperatures measured were periodically logged electronically, with other parameters relating to the embodiment of the invention including the air [[water]] pressure (of the air provided for cooling), and the cooling water pressure and flow rate, together with an indication of time. All of the parameters special to the present embodiment were logged on a conventional logging apparatus used to log welding parameters and as such further parameters were also measured and logged, those further parameters including arc voltage, arc current, the calculated heat input and many others.

UNITED STATES PATENT AND TRADEMARK OFFICE
CERTIFICATE OF CORRECTION

PATENT NO.         : 7,114,881 B2
APPLICATION NO. : 10/380271
DATED              : October 3, 2006
INVENTOR(S)        : Antonio Belloni et al.

It is certified that error appears in the above-identified patent and that said Letters Patent is hereby corrected as shown below:

Column 18, claim 13, please amend as follows:

13. A method according to claim 1, wherein the cooling liquid contacting the interior surfaces of the pipeline is an [[embed]] <u>atomised</u> liquid.

Signed and Sealed this

Thirteenth Day of February, 2007

JON W. DUDAS
*Director of the United States Patent and Trademark Office*